United States Patent [19]
Zurcher

[11] 3,711,216
[45] Jan. 16, 1973

[54] TOOL BIT ADJUSTING DEVICE

[75] Inventor: Eric P. Zurcher, Hasbrouck Heights, N.J.

[73] Assignee: Standard Tool & Manufacturing Co.

[22] Filed: June 25, 1971

[21] Appl. No.: 156,846

[52] U.S. Cl. .................408/153, 408/161, 408/168
[51] Int. Cl. ..........................................B23b 29/34
[58] Field of Search......408/162, 161, 168, 169, 153, 408/158, 171, 198; 29/96; 82/36

[56] References Cited

UNITED STATES PATENTS 3,189,976   6/1965   Pickril..............................408/168 X

*Primary Examiner*—Gil Weidenfeld
*Attorney*—J. King Harness et al.

[57] ABSTRACT

An adjustable wedge for a tool bit has a sloping face on a cylindrical body which is mounted in a cylindrical aperture where it can rotate. The opposite side of the body has a notch engaged by the head of a screw for adjusting the wedge axially within the aperture. A flat triangular bit is retained on a seat by a finger to have a corner tie exposed for cutting. By having the sloping face of the wedge engage the edge of the bit opposite to that of the tip being used, the bit can be adjusted outwardly by the movement of the wedge inwardly of the aperture by the screw. The bit usually is provided with sloping edges which converge to provide relief to the cutting tips and the sloping face of the wedge will cause the wedge to rotate so that the sloping face will be coplanar with the sloping bit edge.

5 Claims, 4 Drawing Figures

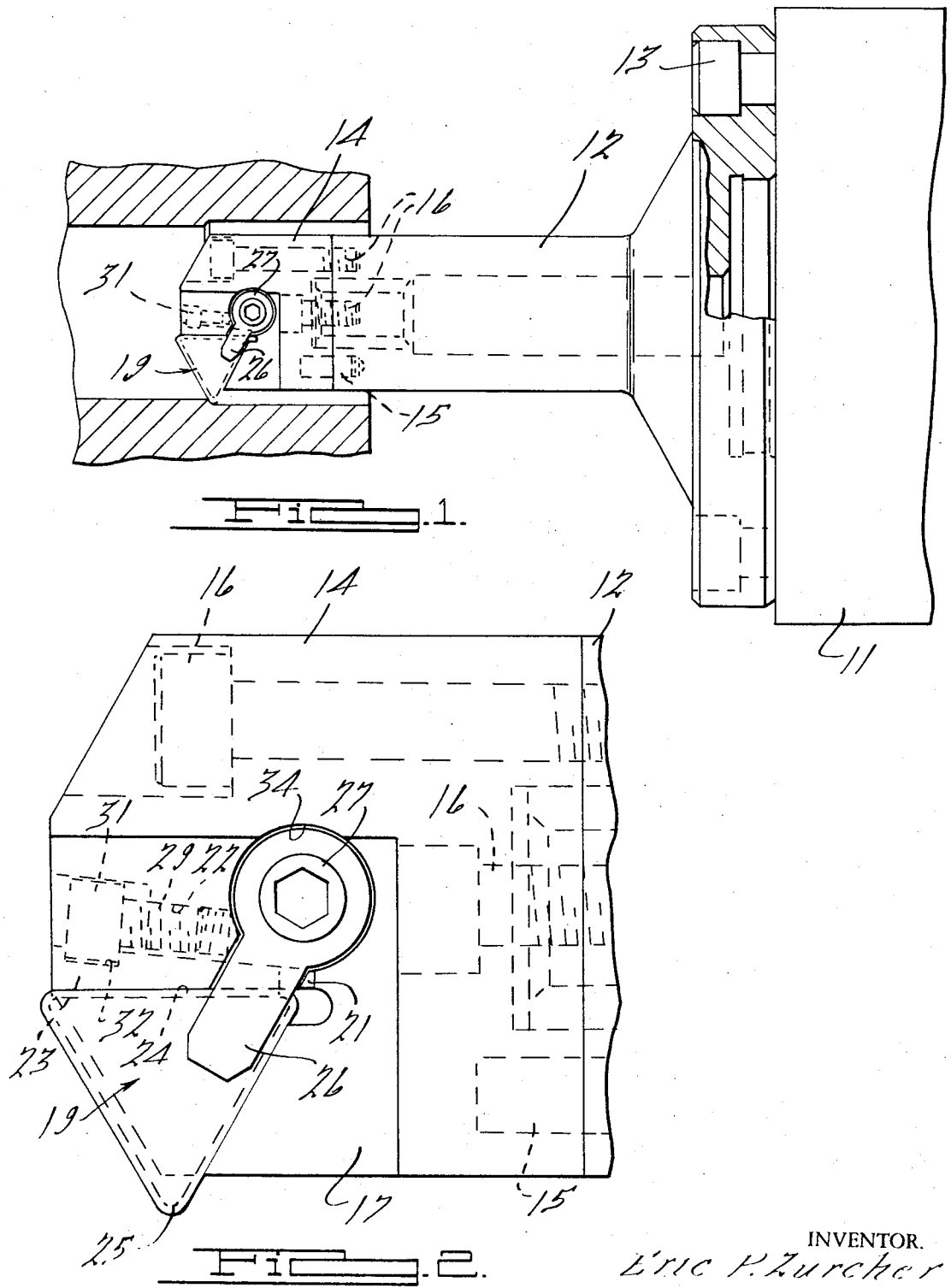

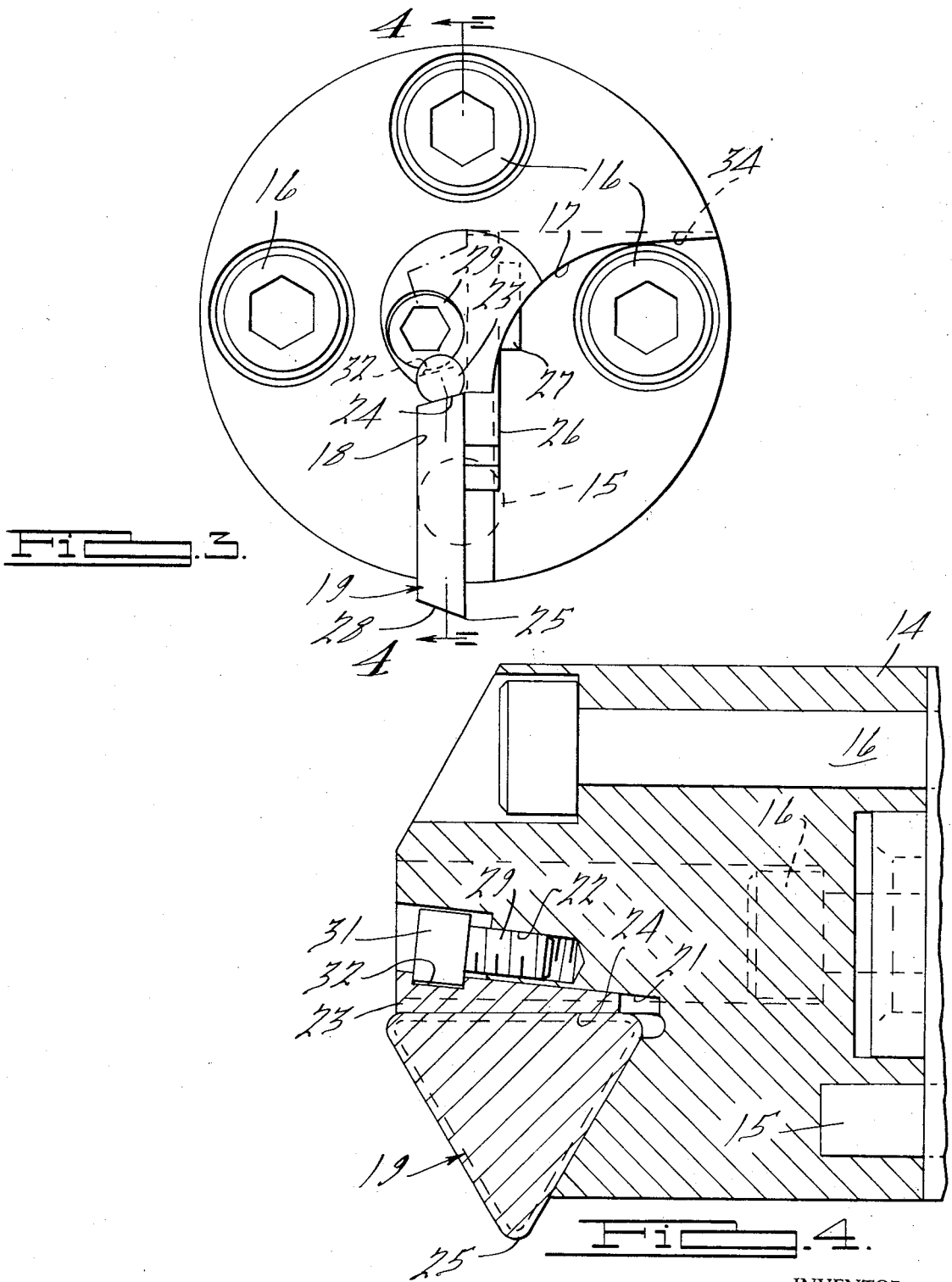

TOOL BIT ADJUSTING DEVICE

BACKGROUND OF THE INVENTION

Reference may be had to U.S. Pat. Nos. 3,032,152; 3,144,795; 3,189,976 and 3,497,935 which were uncovered in a search of the patent art.

SUMMARY OF THE INVENTION

The invention pertains to an adjusting device for moving a cutting tip of a triangular tool bit outwardly on a seat into cutting position and for backing up the bit during the cutting operation. The bit is herein illustrated as being mounted on a boring bar for adjustment toward and away from the central axis thereof. The bit is of the expendable type being constructed from a flat piece of tungsten carbide or similar cutting material which is of triangular shape to provide three cutting tips at the corners. The side edges of the bit can be sloped to converge from the top thereof to provide relief to the cutting tips. A finger holds the bit on the seat with one of the tips extended therebeyond with the edge opposite thereto engaged by an axially adjustable wedge. The wedge has a cylindrical body provided with a sloping face on one side which engages the edge of the bit in coplanar relation therewith. The wedge is mounted in a cylindrical aperture in which it can be rotated by the sloping face when moved into coplanar relation with the bit edge. A notch in the opposite side of the wedge is engaged by the head of a screw which permits the axial adjustment of the wedge within the aperture when the screw is rotated.

BRIEF DESCRIPTION OF THE DRAWINGS

FIG. 1 is a view in elevation with a part in section of a boring bar having an adjustable cutting bit supported thereon by a device embodying the present invention;

FIG. 2 is an enlarged view of the cutting bit supporting end of the bar illustrated in FIG. 1;

FIG. 3 is a lefthand end view of the structure illustrated in FIG. 2, and

FIG. 4 is a sectional view of the structure illustrated in FIG. 3, taken on the line 4—4 thereof.

DESCRIPTION OF THE PREFERRED EMBODIMENT

The boring bar 11 has a reduced cylindrical body 12 mounted on the end thereof by screws 13. The body 12 has a head 14 secured thereto by a dowel 15 and screws 16. The head has a cutaway section 17 with a seat 18 machined on one side for supporting a cutting bit 19 with the top face located on the center of the body 12. An angularly disposed aperture 21 extends inwardly from the end of the head 14 breaking out into the area above the seat 18. A countersunk threaded aperture 22 is disposed adjacent to the aperture 21 and parallel thereto. A plane through the centers of the apertures is disposed at an angle to the plane of the seat 18.

A cylindrical wedge 23 has a face 24 along one side disposed at an angle to the longitudinal axis thereof. The face is disposed at such an angle as to be parallel to the side of the bit opposite to that having a cutting edge 25 supported in position to perform a boring operation. The bit 19 is retained on the seat by a finger 26 secured in position by a screw 27. A hole 34 is drilled into the wall of the cutout portion 17 for the head of the finger 26 and a threaded aperture for the screw 27 is provided on the center thereof. The wall of the hole is cut away to provide clearance for the extending portion of the finger. The bit herein illustrated is of triangular shape having three cutting tips 25 with sides therebetween which slope from the cutting face in converging relation to each other. The sloping edge 28 opposite to the cutting tip 25 located to perform a cutting operation is engaged by the face 24 in coplanar relation to the edge 28. This relationship occurs from the rotation of the wedge 23 within the cylindrical aperture 21.

The face 24 adjusts itself to the edge 28 when the wedge 23 is adjusted longitudinally by a screw 29 which is threaded into the aperture 22. The screw 29 has a head 31 disposed in a slot 32 on the opposite side of the wedge from that having the face 24. By adjusting the screw inwardly the wedge is moved further into the aperture 21 and the bit 19 is moved outwardly of the center line of the head 14. The wedge not only adjusts the cutting tip 25 to a desired radial distance from the center of the head but also backs up the bit with the coplanar engagement of the surface of the face 24 thereof with the edge 28 which reduces the possibility of vibration and chatter.

Sufficient clearance is provided between the bottom of the notch 32 and the head of the screw 31 to permit the rotation of the wedge 23 in the aperture 21. When no relief is provided to the bit, the wedge can rotate sufficiently to permit the face 24 to move into coplanar relation with the edge 28 which is disposed at right angle to the top and bottom surface of the bit. While a plane through the center lines of the wedge 23 and screw 29 is disposed normal to the sloping edge 28 of the bit, the apertures may be located to have such a plane disposed normal to the edge 28 when in right angle relationship to the faces of the bit.

I claim:

1. In a cutting tool, a tool body having a seat, a tool bit, a finger for retaining said bit on said seat, a wedge having a body of cylindrical shape with an axially disposed sloping face on one side and a notch in the side opposite thereto, said tool body having a cylindrical aperture for said wedge so disposed as to locate the slope of the wedge face parallel to a bit edge, and a screw threaded in an aperture in said tool body having a head located in said wedge notch for adjusting said wedge axially within said cylindrical aperture and said sloping face outwardly or inwardly in coplanar relation with one edge of the bit, whereby the coplanar relation between the sloping face of the wedge and the engaged sloping edge of the bit will result from the rotation of the cylindrical wedge within its cylindrical aperture as the wedge is axially adjusted.

2. In a cutting tool as recited in claim 1, wherein said bit is triangular in shape providing three cutting tips at the corners with the edge opposite to the tip which is employed for cutting engaged by the sloping face of the wedge.

3. In a cutting tool as recited in claim 2, wherein the edges of the bit slope in converging relationship from the top to provide relief to the cutting tips.

4. In a cutting tool as recited in claim 1, wherein a plane through the central axes of the wedge and adjusting screw is normal to the edge of the bit engaged by the sloping face of the wedge.

5. In a cutting tool as recited in claim 1, wherein the spaced central axes of the wedge and adjusting screw apertures are parallel and disposed at an angle to the sloping face of the wedge.

* * * * *